INVENTORS:
Antoine Jousset and
Christian Jacquart
ATTORNEY:
A. A. Saffitz

INVENTORS:
Antoine M. JOUSSET
and Christian A. JACQUART
By Abraham A. Saffitz
ATTORNEY United States Patent Office 3,454,722
Patented July 8, 1969

3,454,722

RESTORING SYNCHRONIZATION IN PULSE CODE MODULATION MULTIPLEX SYSTEMS

Antoine M. Jousset, 50 Blvd. Beaumarchais 75, Paris, France, and Christian A. Jacquart, Rue du Pont Hele 22, Perros-Guirrec, France Filed Sept. 14, 1966, Ser. No. 579,312
Claims priority, application France, Sept. 17, 1965, 31,856
Int. Cl. H04j 3/06
U.S. Cl. 179—15 3 Claims

ABSTRACT OF THE DISCLOSURE

Synchronization restoring device for pulse code modulation multiplex systems in which the framing pulses in the successive frames are alternately zero and one digits and the loss of synchronism is restored in response to error pulses obtained from the lack of coincidence between the received framing pulses and locally generated framing pulses. The device comprises means for inhibiting the hunting action of those of the error pulses which, within a first predetermined time $T_2$, are separated from each other by time-intervals smaller than a second predetermined time $T_1$. The times $T_1$ and $T_2$ are multiples of the duration of a frame.

The present invention relates to synchronizing devices for pulse code modulation communication or switching systems of the time-division multiplex type, i.e., for systems using code modulated binary pulses wherein said binary pulses are grouped in recurrent frames. Pulse code modulation multiplex systems in which N telephone channels are sampled at the frequency $f=1/T$ and in which, after sampling, the amplitude of each sample is coded in a group of $n$ pulses using a binary code and in which these code-groups are finally multiplexed in time to form a frame of $Nn+\theta$ pulses in which $Nn$ pulses are those relating to the N channels and in which the $\theta$ pulses are used for purposes which will be explained hereinafter, may be mentioned as examples of communication systems to which the present invention applies. The data transmission systems, in which characters are coded in groups of $n$ binary pulses and in which said groups are then transmitted cyclically, may likewise be mentioned. These data transmission systems may comprise N time-multiplexed channels in which case the whole signal has precisely the same appearance as in a pulse code modulation system. When the data transmission system only comprises one channel, the frame may be regarded as formed from $n$ groups each of one pulse, the equivalent of the channel then being the ordinal number of the pulse in the group.

In the communication systems using code pulse modulation, the signal transmitted over the transmission line is a series of binary pulses having the value zero or the value one following one another recurrently. In order to distinguish between the different groups of pulses each corresponding to a channel in the system, it is necessary to provide, in the receiver, a synchronization device frequently called a "bit clock" or flywheel, synchronous with the master-clock of the transmitter, distribution circuits, the purpose of which is to cut up the pulses in the whole signal into sections and sub-sections with given destinations, the sections of $n$ pulses representing the channels, and the sub-sections each of one pulse representing, in each group of channel pulses, a code element of a given binary weight, and a circuit for detecting loss of synchronism and for regaining synchronism.

In other words, the synchronization device is adapted to adjust the signal distributors defining the channel time slots and the code elements time slots, the adjustment being effected, in a suitable position, in order that the orientation and the interpretation of said channel time slots and code elements time slots be correct.

There may be two causes of faulty adjustment of the signal distributors:

(1) When multiplex equipment is started, the time slots allotted to the transmitter sampling and multiplexing circuits are not in synchronism with the time slots associated with the receiver demultiplexing circuits.

(2) A displacement in time may occur in the course of operation as a result of the fact that the telephone communication has been impaired either by a noise or by interruptions in the line.

In order to effect the adjustment of the synchronization device, it is necessary for the whole signal to comprise a synchronization or framing signal in each frame. In certain cases, this synchronization signal has such characteristics that it can be recognized by the receiver equipment of the multiplex system. For example, a synchronization signal may be a pulse having a different amplitude or duration from that of the code pulses or it may consist of a group of pulses having particular spacing. In these multiplex systems in which the synchronization signal has a particular configuration, the detection of the loss in synchronism and the restoration thereof are effected easily and quickly. But the production and detection of the particular synchronization signal complicate the equipment.

In other multiplex pulse code modulation communication systems, the synchronization signal is not distinct from the code pulses. It consists of a particular pulse, often called "winking" pulse, in the group of $\theta$ pulses in the frame and this particular pulse recurs once every other frame, i.e. is present in one frame, absent in the following frame and so on. This selection of the synchronization signal offers important advantages. In effect, of the pulses in the frame, a particular group of $\theta$ pulses is reserved for the transmission of the telephone signalling, the spectrum of which is narrower than that of the telephone signals. It follows that the sampling frequency for the signalling signals can be lower than that of the conversation signals and that in consequence the signalling sample of a given channel only appears in certain frames, for example one frame out of three. On the other hand, the signalling samples which appear in a frame can be coded with a smaller number of binary digits than that of the message binary digits in a conversation channel. It follows that the group of signalling pulses in each frame contains at least one free location for a winking framing pulse which may be used for the synchronization.

In the systems with winking framing pulses, the restoration of the synchronization necessitates a fairly long delay which is equal on the average to the duration of a number of frames equal to half the number of binary digits per frame as will be explained later. Since a noise is produced in each conversation channel, while the synchronization is lost and the system for restoring synchronization is trying to restore it step by step as will be seen, it is essential that a restoration of synchronization should not be initiated except when there is a real loss of synchronization.

Now one error in a synchronization pulse does not automatically mean that there is a loss of synchronization. The synchronization may be temporarily at fault in the sense that one or a succession of synchronization signals are faulty without the synchronization actually being lost.

It is very easy to produce bit clocks having a stability of the order of $10^{-6}$, that is to say that, left to themselves, they do not depart from a period of recurrence of the binary digits in the multiplex signal, that is to say they do not become phase-displaced from 360° or from 100% except after $10^6$ binary digits. If it is assumed that the frame consists of 250 binary digits, at the end of $10^5$ binary digits, that is to say at the end of 400 frames, the phase-displacement of the bit-clock is only 36° or 10%. It will therefore be seen that it is harmful to initiate a restoration of synchronization as soon as one synchronization signal is faulty.

In the system with winking framing pulses, the circuit for detecting a fault in synchronization according to the prior art comprises means for producing two locally generated framing pulse trains, each comprising local framing pulses distant by a time equal to the duration 2T of two frames, these local pulse trains being in phase opposition, and two comparators the first comparing the received framing pulses which are ones (pulse train $b$) to the local framing pulses of the first train $d$, and the second comparing the received framing pulses which zeros after inversion of the same (pulse train $c$) to the local framing pulses of the second train $e$. So there are four pulses trains $b$, $c$, $d$, and $e$ in each of which the pulses are distant by 2T.

The first comparator compares pulse trains $b$ and $d$ and the second comparator compares pulse trains $c$ and $e$. When synchronism is maintained the pulses of trains $b$ and $d$ on the one hand and the pulses of trains $c$ and $e$ on the other hand do not coincide and the comparators deliver no fault pulse. When the pulses compared are coincident, a fault signal is produced, the synchronization fault signal is regarded as an actual loss of synchronism and the access of the clock pulse sto the distributors is blocked for one clock pulse. It follows that the local framing pulse relative to the frame preceding the frame being received, is delayed by one time slot in the clock pulses, namely $T/(Nn+\theta)$. Thus, in the case of loss of synchronism, the device for obtaining synchronization compares, at the rate of once per frame, the pulses received with a local framing pulse which is phase-displaced from one frame to another by the interval of recurrence of the clock pulses $T/(Nn+\theta)$, until the synchronization has been restored. It will be seen that there is readjustment of the bit clock by blocking of the device affording access from this to the distributors on each discrepancy in comparison although this discrepancy may originate from erroneous signals applied to the comparators and received from the transmission line as well as from an actual loss of synchronism.

Synchronization systems have been proposed in the prior art in which the defect of producing hunting over all the channels by only one error of a framing pulse was eliminated. In these systems hunting for synchronization is performed only when a plurality of framing pulses are successively erroneous in view of the generally admitted fact that the actual collapse of synchronism does not occur upon the loss of a single framing pulse. Framing errors are counted or stored in an integrating circuit of the resistance-capacitance type. When the counter has counted up a predetermined error number or when the cumulative voltage built-up in the integrating circuit has reached a predetermined value, a decision circuit is triggered which initiates hunting for recovering of synchronization.

The present invention uses a different criterion as the condition for initiating the hunting for synchronization recovery.

According to the invention, the access device from the bit clock to the distributors is only blocked when the fault pulses originating from the comparators are produced with an average frequency higher than a predetermined value $l/T_1$ over a time greater than a predetermined value $T_2$, the times $T_1$ and $T_2$ being multiples of the duration T of a frame $T_2$ being greater than $T_1$.

More precisely, a delay device is inserted between the above-mentioned comparators and the means for cutting off the device affording access from the bit clock to the distributors for channels and code channels, and said delay device comprises a first bistable circuit which changes from the zero state to the one state if it is not already there when it receives a fault pulse originating from the comparators and remaining in the one state for a time $T_1$ after each fault pulse, and a second bistable circuit in series with the first which changes from the zero state to the one state when the pulse leaving the first bistable circuit has lasted for a period at least equal to $T_2$ and changes back to the zero state when the pulse leaving the first bistable circuit ceases.

Indications regarding the values of $T_1$ and $T_2$ are given hereinafter.

The invention will now be described in detail in the case of a pulse code-modulation time-division multiplex communication system and with reference to the accompanying drawings in which.

It will be recalled that in a pulse amplitude-modulation time-division multiplex system comprising N channels each sampled at the frequency $l/T$, with $n$ digits per channel, the frequency of the pulses of the multiplex signal becomes $Nn/T$ if $\theta=0$ and $(Nn+\theta)/T$ if $\theta\neq 0$.

The pulse code modulation multiplex communication system which will be taken as an example in the present specific description comprises fifteen channels plus one channel identical with the fifteen others adapted for the transmission of the signalling and the synchronization, that is to say $\theta=n$ and $N+1=16$, and in each channel, the samples of the telephone signals are coded in eight code digits, that is to say $n=8$. The period of sampling the signals in each channel, which is the frame duration, is $T=128$ microseconds, which corresponds to a basic repetition rate of the digits for all the channels approximately equal to $$(Nn+\theta)/T=(N+1)n/T=\frac{16\times 8}{128\ 10^{-6}}=1 \text{ mHz}$$

The framing pulses are the first pulses of each sixteenth channel.

Figure 1:
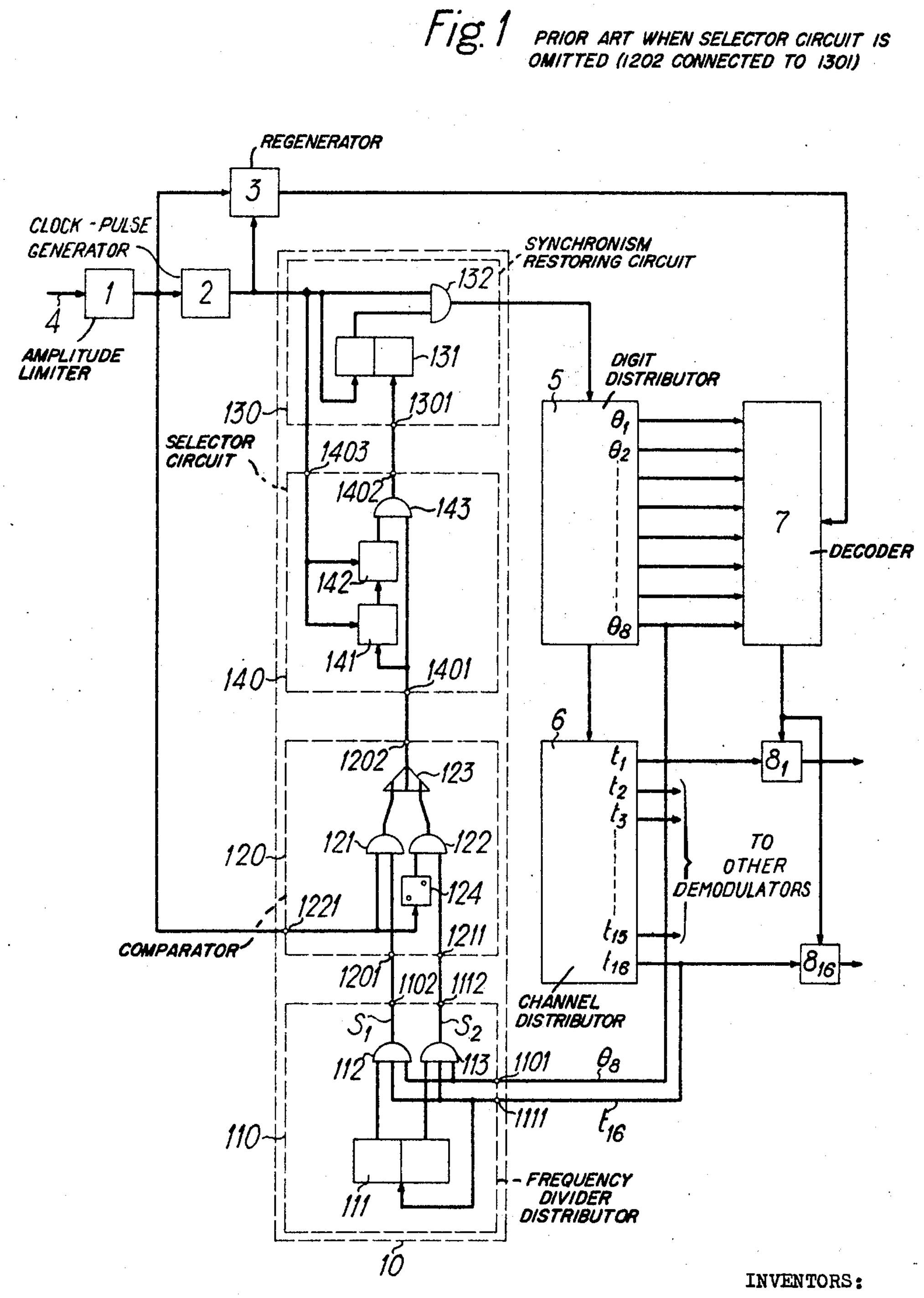
FIGURE 1 illustrates in the form of a block diagram the device for obtaining synchronization of a receiver according to the invention.

Referring to FIGURE 1, if, for a while, block 140 is disregarded and terminal 1202 of block 120 is assumed directly connected to terminal 1301 of block 130, then FIG. 1 represents a synchronizing device of the prior art controlled by winking pulses.

The structure and operation of such a device according to the prior art are briefly recalled.

1 designates an amplitude limiter circuit feeding in parallel a clock-pulse generator 2 and a regenerator 3 which regenerates the pulses arriving on the line 4. At the output of the regenerator 3, modulated pulses are found and at the output of the clock-pulse generator 2 clock pulses are found which are obviously not modulated. The output of the clock-pulse generator 2 is connected by means of the device 10 for obtaining synchronization to a code digit distributor 5 with eight outputs $\theta_1$ to $\theta_8$ then to a channel distributor 6 with sixteen outputs $t_1$ to $t_{16}$. These distributors are shift-registers, for example ring counters.

The outputs of the code digit distributor 5 are connected to the decoder 7 which receives the modulated pulses leaving the regenerator 3 and the outputs of the distributor 6 are connected respectively to the demodulators $8_1$ to $8_{16}$ all of which also receive the reconstituted samples leaving the decoder 7. A lowpass filter which is not illustrated is found at the output of each demodulator as is well known.

The circuits for detecting faults in the synchronization signal are represented by the blocks 110 and 120 in the synchronization device 10. The block 110 is a frequency divider by two and a distributor; it comprises a trigger circuit 111 having a symmetrical control input connected to the terminal $t_{16}$ of the channel distributor 6 in such a manner that it divides the frame frequency by two, and two AND gates 112 and 113 with three inputs. The first two inputs of each gate are respectively connected to the terminals $\theta_8$ and $t_{16}$ through the terminals 1101 and 1111 in order to select the local framing pulses, the third input of the gate 112 being further connected to one of the outputs of the trigger circuit 111 and the third input of the gate 113 being further connected to the other output of the trigger circuit 111. It follows that the local framing signals at the outputs 1102 and 1112 of the circuit 110 are respectively two trains of pulses separated from one another by 256 microseconds, the pulses in one train being displaced in relation to the pulses in the other train by 128 microseconds. In other words the local framing pulse trains are in phase opposition.

The pulses arriving from the transmission channel 4 are applied through the terminal 1221 to a comparator 120 which likewise receives the local framing pulse trains through the terminals 1201 and 1211. This comparison circuit is composed of two AND gates 121 and 122 and an OR gate 123. The AND gate 121 receives pulse trains *b* and *d* and AND gate 122 receives pulse trains *c* and *e*, the pulse train *c* being received through an inverter 124. It follows that when the synchronism is established, the signals of the inputs of 121 are on the one hand a one digit representing the directly received framing pulse of the frame of the multiplex signal being received and on the other hand a zero digit because, as a result of the operation of the trigger circuit 111, the local framing pulse corresponding to the previous frame is applied at the same moment to the input of the gate 113; there is therefore no pulse at the output of the gate 121. In the same manner, when there is synchronism, the signals at the inputs of 122 are on the one hand a one digit representing the directly received and inverted framing pulse of the frame of the multiplex signal being received and on the other hand a zero digit because as a result of the operation of the trigger circuit 111, the local framing pulse of the the previous frame is applied to the input of the gate 112 at the same moment; there is therefore no pulse at the output of the gate 122. It follows that in the case of synchronism, there is no fault signal at the output 1202 of the comparison circuit 120.

The synchronism restoring circuit comprises a trigger circuit 131 actuated by the clock pulses at the digit frequency of all the channels and an AND gate 132 which receives on the one hand the clock pulses and on the other hand the output digit one of the trigger circuit 131 (it is assumed that when a signal is applied to the input at one side, the trigger circuit emits the signal one at the output at said side). On the other hand, the trigger circuit is adapted in such a manner that if signals are applied simultaneously to both its inputs, the output digit is zero. It follows that so long as the synchronism remains, 131 remains, in the one state and the gate 132 is passing. When an error signal is applied to the input 1301, the trigger circuit 131 is brought into the zero state and the gate 132 is blocked. The distributors 5 and 6 do not advance for the duration of one period of recurrence of the clock pulses and the local framing pulses are time-displaced and compared with the pulses received in succession at the rate of one comparison per frame until the synchronization is recovered. In the course of each frame, there is a comparison between the local framing pulse relative to the frame and a pulse of the frame other than the framing pulse. Since there are 128 pulses in each frame, an average of 64 frames is needed to recover the lost synchronization, that is to say on the average $64 \times 128$ $\mu$s.$=$8.192 ms.

It is known and currently accepted that a pulse code modulation multiplex communication system still works satisfactorily with an error rate of $10^{-6}$ in the code digits. And even in the case where the bit clock 2 is reduced to a band-pass filter with a narrow band centered on 1 mHz., such an error rate can easily be adhered to. With such an error rate, the probability of error per frame and per channel, that is to say in eight code digits is $8 \cdot 10^{-6}$. Each error gives rise to a pip on the channel; the average frequency of the pips per channel is therefore:

$8.10^{-6}/128.10^{-6}=0.0625$ pip per second or 3.75 pips per minute.

With the device for maintaining synchronization in the prior art and the accepted error rate of $10^{-6}$, the probability of having an erroneous framing digit is one in $10^6$ frames of 128 microseconds, that is to say 128 seconds or 2.13 minutes. Therefore, every 2.13 minutes on the average, a synchronization seeking noise lasting on the average 8.192 milliseconds occurs; on the average, it is distributed equally between all the channels.

As was explained in the introductory portion of the present specification, according to the invention the synchronization is not restored every time a synchronization fault is discovered, nor it is restored after a given number of synchronization faults have been detected, but when the fault pulses appear in succession at close intervals over a sufficiently long time. The selector circuit 140 comprises two delay circuits of the monostable flip-flop type 141 and 142 connected in series and an AND gate 143, the inputs of which are respectively connected to the input 1401 of the selector circuit and to the output of the delay circuit 142. At its input 1401, the circuit 141 receives the synchronization fault pulses appearing at the output 1202 of the comparison circuit 120. On each fault pulse, the circuit 141 changes over from normal (zero state) to operation (one state) and remains in operation for a time $T_1$ following the moment when said fault pulse was applied. It follows that a series of fault pulses, which are too close together to allow intervals of time greater than $T_1$ between them, maintain the circuit 141 in the one state. In other words, the circuit 141 is operated and maintained in operation by sufficiently frequent fault pulses.

As the back-triggering of monostable flip-flops is rather unprecise, the clock pulses are applied to circuits 141 and 142 via terminal 1403. These pulses cooperate with the R-C circuits of the flip-flops for obtaining a jitter-free back-triggering.

The delay circuit 141 is in series with another bistable delay circuit 142 which changes from normal (zero state) to operation (one state) when the pulse leaving $T_1$ which acts on it has a duration of at least $T_2$ and in this case the changing over of the circuit 142 takes place at the moment $T_2$ following the beginning of the trigger pulse and ceases at the end of the trigger pulse.

Figures 2, 3:
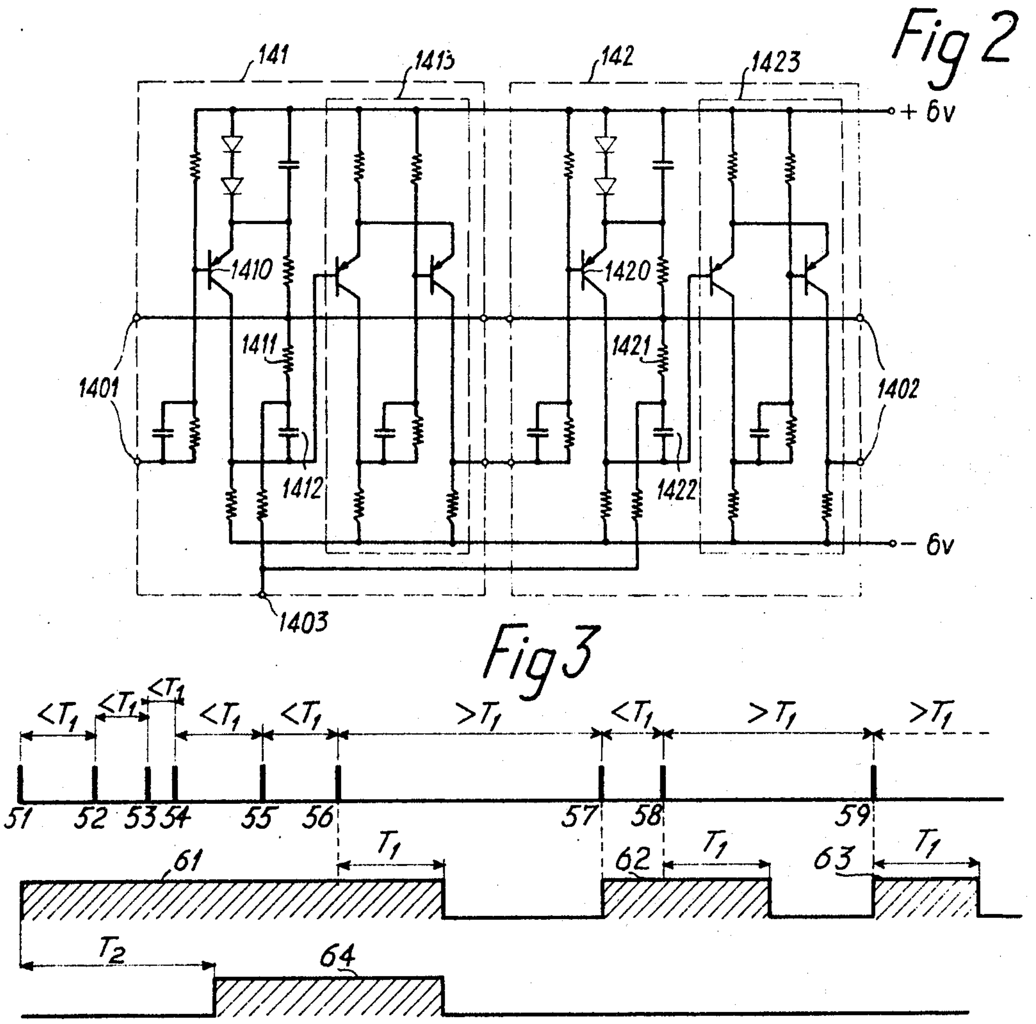
FIGURE 2 illustrates a possible detailed electrical diagram of the delay device comprised in the device for obtaining synchronization.
FIGURE 3 is a diagram of the signals necessary for an explanation of the invention.
Figure 4:
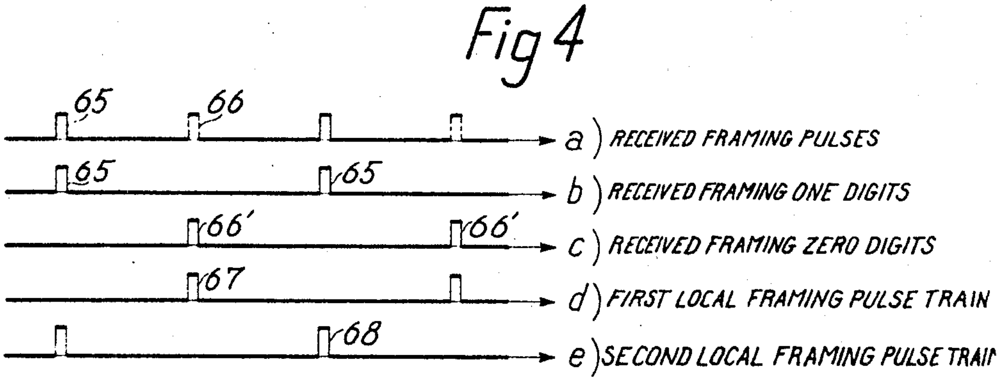
FIGURE 4 illustrates the framing pulses and pulse trains.

FIGURE 3 illustrates fault pulses 51 to 59 and shows whether the intervals between these pulses were less than or greater than $T_1$. With the interval values indicated, it will be seen that the circuit 141 is in the one state from the pulse 51 to a moment following pulse 56 by $T_1$ (pulse 61), from the pulse 57 to a moment following the pulse 58 by $T_1$ (pulse 62) and for a period $T_1$ beginning at the pulse 59 (pulse 63). The circuit 142 is in the one state from a moment following the beginning of the pulse 61 by $T_2$ to the end of said pulse (pulse 64). Since the pulses 62 and 63 have a duration less than $T_2$, the delay circuit 142 does not pass into the one state when they are applied thereto.

It is therefore possible to say that the circuit 142 is brought into the one state when the period during which the fault pulses are sufficiently frequent is long enough.

FIGURE 2 gives the electrical diagram of the delay circuits 141 and 142 in the case of a pulse code modulation telephone communication system with sixty channels already multiplexed in frequency and having a band width of 300 kHz. So there is no time division. The number of code elements is nine significant elements and one synchronization element, this latter element being successively positive and negative. In such a pulse code modulation system: $N=1$; $n=10$; and if it is assumed that $$f-1/T=640$$

kHz., the frequency of the bit clock is $Nnf=6.4$ mHz. The duration T of the frame is $\frac{1}{640}\cdot 10^{-3}=1.56$ $\mu$s.

Each circuit 141 or 142 comprises an amplifier transistor, 1410 and 1420 respectively, a delay circuit with a resistor and capacitor, 1411–1412 and 1421–1422 respectively, and a Schmitt trigger circuit, 1413 and 1423 respectively. The characteristics of the resistor and capacitor circuits are determined in such a manner that $T_1=15.60$ $\mu$s., that is to say 10 frames; $T_2=24.96$ $\mu$s., that is to say 16 frames.

In another device for obtaining synchronization constructed by the applicants and corresponding to a pulse code modulation time-division multiplex communication system in which: $N=36$; $n=6$; duration T of the frame=125 $\mu$s; the selection was $T_1=1.875$ ms., that is to say 15 frames; $T_2=6.250$ ms., that is to say 50 frames.

In a third device corresponding to a pulse code modulation time-division multiplex communication system in which: $N=16$; $n=8$; duration T of the frame=128 $\mu$s; the selection was $T_1=1.536$ ms., that is to say 12 frames; $T_2=7.168$ ms., that is to say 56 frames.

The selection of the values for the times $T_1$ and $T_2$ can only be final as a result of experiments; nevertheless, it is possible to reduce the trial and error and to have orders of magnitude for these times which are sufficiently precise by trying to calculate the probability $\pi$ $(T_1,T_2)$ in such a manner that if the synchronism is lost at the moment zero and the circuit 142 is operative at the same moment, said circuit 142 returns to normal before the moment $T_2$; these are the conditions under which the timing device according to the invention is fully effective, that is to say under which it does not miss an error in synchronisation.

In order to facilitate the calculation, the phenomenon will be outlined as follows. It will be agreed that at the input of the circuit 141, the supply of fault pulses is effected in accordance with a Poisson distribution, with the constant probability $\nu dt$ for the time $dt$. The probability P of not having a fault in the synchronisation signal during the duration T of a frame is:

$$P=\exp(-\nu T)$$

and in consequence:

$$\nu=-\frac{1}{T}\log_e P \qquad (1)$$

The probability that the circuit 141 will return to normal during the time $dt$ is therefore equal to: [probability that the circuit 141 has been set in operation between $-T_1$ and $(-T_1+dt)$] × [probability that there has not been any fault pulse in the interval $(-T_1, O)$] $=\nu dt\cdot exp(-\nu T_1)$.

The probability that the circuit 141 will be in operation at a given moment is $$1-\exp(-\nu T_1)$$

Knowing that the circuit 141 is in operation at the moment zero, the probability that there has not been a fault pulse between $(-t+dt)$ and zero is $$\frac{\nu dt\ \exp(-\nu t)}{1-\exp(-\nu T_1)}$$

This is the probability that the circuit 141 will change from operation to normal in the interval (O, $dt$).

Now let $P_{T_1}(t)$ be the probability that if the circuit 141 is in operation at the moment zero it will nevertheless not have returned to normal at the moment $t$. The probability that the circuit 141 will remain in operation from zero until $t$ but will return to normal in the interval $(t, t+dt)$ is equal to the product of: the probability $P_{T_1}(t)$ and the probability $$\frac{\nu dt\ \exp(-\nu t)}{1-\exp(-\nu T_1)}$$

that is to say:

$$P_{T_1}(t)\frac{\nu dt\ \exp(-\nu t)}{1-\exp(-\nu T_1)}$$

Now the probability sought is precisely $-dP_{T_1}(t)$; by integrating, therefore, it is found that:

$$P_{T_1}(t)=\exp\left[\frac{-\nu t\ \exp(-\nu T_1)}{1-\exp(-\nu T_1)}\right] \qquad (2)$$

Starting now at the moment when the appearance of the faults begins, that is to say at the beginning of a loss of synchronisation, because of the presence of a fault at this moment the circuit 141 comes into operation for a duration $T_1$ following said fault pulse and it is only after a time $T_1$ that the Formula 2 above can be applied. It follows that $P_{T_1}(T_2-T_1)$ is the probability that the loss of synchronism will be detected before the time $T_2$, since it is certain that the circuit 141 will not have returned to normal, the circuit 142 is certain to have come into operation. Therefore, according to the Equation 2:

(3)

$$\pi(T_1, T_2)=P_{T_1}(T_2-T_1)=\exp\left[\frac{-\nu(T_2-T_1)\ \exp(-\nu T_1)}{1-\exp(-\nu T_1)}\right]$$

Replacing $\nu$ by its value given by (1):

(4) $$\exp(-\nu T_1)=P^{T_1/T}$$

is obtained, and by including it in the Equation 3

(5) $$\pi(T_1, T_2)=\exp\left[\frac{\frac{T_2-T_1}{T}(\log_e P)P^{T_1/T}}{1-P^{T_1/T}}\right]$$

results.

When there is a high probability that the circuit 141 will remain in operation for a certain time or that at least one fault pulse will appear in the time $T_1$, the quantity $P^{T_1/T}$ is small in comparison with unity and it may be said:

(6) $$\pi(T_1, T_2)\approx\exp\left[\frac{T_2-T_1}{T}(\log_e P)P^{T_1/T}\right]$$

This is the expression giving the probability that the timing device according to the invention will be fully effective at the end of the time $T_2$.

If the argument in brackets of the exponential of the relationship (6) is sufficiently small, it its possible to write:

(7) $$\pi(T_1, T_2)=1+\frac{T_2-T_1}{T}(\log_e P)P^{T_1/T}$$

Referring back to the expression 5 and extending P towards unity, it will be seen that $\pi(T_1, T_2)$ has as its limit:

(8) $$\text{limit}\ \pi(T_1, T_2)=\exp\left(-\frac{T_2-T_1}{T}\right)\ P\longrightarrow 1$$

If it is assumed that the transmission system works with a minimum probability of error (P close to 1), the relationship 8 represents the probability that, once the circuit 141 has been triggered by a fault pulse, the device of the invention will be wrongly actuated again by another fault pulse. The expression 8 is therefore the probability that a fault pulse will wrongly trigger a needless restoration of sychronisation.

The above mathematical statement has been considerably simplified; a stricter expression of the probability calculated at (8) is:

$$\pi(T_1, T_2) \approx (1-P)\frac{T_1}{T}\exp\left(-\frac{T_2-T_1}{T}\right) \quad (9)$$

An example of numerical application is given below:

It is assumed that the probability that the system will not have its full efficiency is $10^{-3}$ (the system does not detect one loss in synchronism out of a thousand), that P is equal to a ½ and that $T_2/T=50$, that is to say that $T_2$ is equal to the duration of 50 frames. Then $$10^{-3}=1-\pi(T_1, T_2)=-\frac{T_2-T_1}{T}(\log_e P)P^{T_1/T}$$

or $$\frac{2^{T_1/T}}{700}+T_1/T=50$$

that is to say $$T_1/T\approx 15$$

The values of the second device constructed by the applicants are found.

For the same value of P and for $$1-\pi(T_1,T_2)=10^{-2}$$

and $$T_2/T=16$$

one would have found $T_1/T$ comprised between 9 and 10, which is the value of the first device constructed by the applicants.

Practical values are between 5 and 15 for $T_1/T$ and between 15 and 60 for $T_2/T$.

What we claim is:

1. In a pulse code modulation multiplex system using code pulses grouped in frames and a synchronizing pulse in each frame, in which the synchronizing pulses in the successive frames are pulses of alternate values zero and one and the loss of synchronism is restored in response to error pulses obtained from the lack of coincidence between the synchronizing pulse selected from within a frame preceding a frame being received and the inverted synchronizing pulse of said received frame, by causing a receiver code pulse separator to hunt for the correct synchronizing pulse, the improvement therein to control hunting, comprising means for inhibiting the error pulses which within a first predetermined time $T_2$ are separated from each other by time-intervals smaller than a second predetermined time $T_1$, said first and second predetermined times $T_2$ and $T_1$ being multiples of the duration of a frame and $T_2$ being greater than $T_1$, and means for controlling said receiver code pulse separator by said non-inhibited error pulses.

2. In a pulse code modulation multiplex system using code pulses grouped in frames and a synchronizing pulse in each frame, in which the sychronizing pulses in the successive frames are pulses of alternate values zero and one and the loss of synchronism is restored in response to error pulses obtained from the lack of coincidence between the synchronizing pulse selected from within a frame preceding a frame being received and the inverted synchronizing pulse of said received frame, by causing a receiver code pulse separator to hunt for the correct synchronizing pulse, the improvement therein to control hunting, comprising a first trigger circuit, means for applying said error pulses to said first trigger circuit and for triggering it from the zero state to the one state during a time equal to a given predetermined time $T_1$ following the triggering error pulses, a second trigger circuit serially connected to the first trigger circuit, means for gating and inhibiting the output pulses of said first trigger circuit having a duration less than another predetermined time $T_2$, means for triggering from the zero state to the one state said second trigger circuit by said non-inhibited output pulses of said first trigger circuit and means for initiating the hunting of said receiver code pulse separator by the output pulses of said second trigger circuit, said given predetermined time $T_1$ and said other predetermined time $T_2$ being multiples of the duration of a frame and $T_2$ being greater than $T_1$.

3. In a pulse code modulation multiplex system using code pulses grouped in frames and a synchronizing pulse in each frame, in which the synchronizing pulses in the successive frames are pulses of alternate values zero and one and the loss of synchronism is restored in response to error pulses obtained from the lack of coincidence between the synchronizing pulse selected from within a frame preceding a frame being received and the inverted synchronizing pulse of said received frame, by causing a receiver code pulse separator to hunt for the correct synchronizing pulse, the improvement therein to control hunting, comprising means for inhibiting the error pulses which within a predetermined time $T_2$ are separated from each other by time intervals less than another predetermined time $T_1$, the time $T_1$ being comprised between 5 and 15 times the duration of a frame, the time $T_2$ being comprised between 15 and 60 times the duration of a frame and $T_2$ being greater than $T_1$, and means for controlling said receiver code pulse separator by said non-inhibited error pulses.

References Cited

UNITED STATES PATENTS

| | | | |
|---|---|---|---|
| 3,144,515 | 8/1964 | Kaneko | 179—15 |
| 3,261,918 | 7/1966 | Sisti | 179—15 |

ROBERT L. GRIFFIN, *Primary Examiner.*

CARL R. VON HELLENS, *Assistant Examiner.*

U.S. Cl. X.R.

325—41